United States Patent
Czaja et al.

(10) Patent No.: US 8,744,493 B2
(45) Date of Patent: Jun. 3, 2014

(54) LOCALIZED SILENCE AREA FOR MOBILE DEVICES

(75) Inventors: Stanislaw Czaja, Cardiff, CA (US); Mark E. Davis, Carlsbad, CA (US)

(73) Assignee: Via Telecom, Inc., San Diego, CA (US)

( * ) Notice: Subject to any disclaimer, the term of this patent is extended or adjusted under 35 U.S.C. 154(b) by 440 days.

(21) Appl. No.: 12/471,651

(22) Filed: May 26, 2009

(65) Prior Publication Data

US 2009/0298475 A1  Dec. 3, 2009

Related U.S. Application Data (60) Provisional application No. 61/056,451, filed on May 28, 2008.

(51) Int. Cl.
  *H04W 24/00* (2009.01)

(52) U.S. Cl.
  USPC ........ 455/456.4; 455/463; 455/449; 455/448; 455/414.1; 455/404.1; 370/338

(58) Field of Classification Search
  USPC ............. 455/456.4, 404.1, 412.2, 414.1, 420, 455/421, 432.3, 448, 449, 456.1, 463; 370/328–338
  See application file for complete search history.

(56) References Cited

U.S. PATENT DOCUMENTS

| | | |
|---|---|---|
| 5,508,708 A | 4/1996 | Ghosh et al. |
| 5,920,554 A | 7/1999 | Nakamura et al. |
| 6,049,596 A | 4/2000 | Dumaine et al. |
| 6,141,565 A | 10/2000 | Feuerstein et al. |
| 6,246,673 B1 | 6/2001 | Tiedemann, Jr. et al. |
| 6,526,039 B1 | 2/2003 | Dahlman et al. |
| 6,711,149 B1 | 3/2004 | Yano et al. |
| 6,775,318 B2 | 8/2004 | Chen et al. |
| 6,829,534 B2 | 12/2004 | Fuchs et al. |
| 6,907,254 B1 * | 6/2005 | Westfield ................... 455/456.4 |
| RE38,808 E | 10/2005 | Schuchman et al. |
| 6,975,988 B1 * | 12/2005 | Roth et al. ..................... 704/260 |
| 7,064,709 B1 | 6/2006 | Weisenburger et al. |
| 7,289,473 B1 | 10/2007 | Padovani et al. |

(Continued)

FOREIGN PATENT DOCUMENTS

| | | |
|---|---|---|
| CN | 1229563 | 9/1999 |
| CN | 1783822 | 6/2006 |

(Continued)

OTHER PUBLICATIONS

"Position Determination Service Standard for Dual Mode Spread Spectrum Systems." 3rd Generation Partnership Project 2 "3GPP2". 3GPP2 C.S0022-0 Version 3.0, Feb. 16, 2001. pp. 1-146.

*Primary Examiner* — Quan M Hua
(74) *Attorney, Agent, or Firm* — Richard K. Huffman; James W. Huffman (57) ABSTRACT

A system and method for creating a localized silence area. A mobile device may be registered with an access point base station. Any direct communication links from the mobile device to any other base stations may be removed. An indication may be given to the mobile device that the mobile device is in a localized silence zone. The indication may include a request that the mobile device operate in a silent mode, information about making outgoing calls, information about receiving incoming calls, or a combination of these. Procedures for incoming voice calls to the mobile device may be different for different priority levels.

17 Claims, 3 Drawing Sheets

(56) References Cited

U.S. PATENT DOCUMENTS

| | | |
|---|---|---|
| 7,388,838 B2 | 6/2008 | Abraham et al. |
| 7,423,994 B2 | 9/2008 | Liu et al. |
| 7,500,119 B2 | 3/2009 | Tsai |
| 7,509,124 B2 | 3/2009 | O'Neil |
| 7,551,930 B2 * | 6/2009 | Lempio et al. ............. 455/456.3 |
| 7,564,485 B2 * | 7/2009 | Nath et al. ................. 348/211.2 |
| 7,613,444 B2 | 11/2009 | Lindqvist et al. |
| 7,664,492 B1 | 2/2010 | Lee et al. |
| 7,756,531 B2 * | 7/2010 | Aminzadeh ................ 455/456.4 |
| 7,768,983 B2 | 8/2010 | Nylander et al. |
| 7,817,997 B2 | 10/2010 | Nylander et al. |
| 7,830,847 B1 | 11/2010 | Sill et al. |
| 8,089,400 B1 | 1/2012 | Fang et al. |
| 2002/0049058 A1 * | 4/2002 | Tee ................................ 455/437 |
| 2002/0187792 A1 | 12/2002 | Kato et al. |
| 2003/0202564 A1 | 10/2003 | Ho et al. |
| 2004/0057468 A1 | 3/2004 | Shieh et al. |
| 2004/0165528 A1 | 8/2004 | Li et al. |
| 2004/0170221 A1 | 9/2004 | Storm et al. |
| 2004/0185863 A1 * | 9/2004 | Ogami ....................... 455/452.1 |
| 2004/0205158 A1 | 10/2004 | Hsu |
| 2005/0026616 A1 * | 2/2005 | Cavalli et al. ................ 455/436 |
| 2005/0192024 A1 | 9/2005 | Sheynblat |
| 2005/0282559 A1 * | 12/2005 | Erskine et al. ............. 455/456.4 |
| 2006/0166671 A1 | 7/2006 | Rajkotia et al. |
| 2006/0274743 A1 | 12/2006 | Yegin et al. |
| 2006/0276201 A1 | 12/2006 | Dupray |
| 2007/0105568 A1 | 5/2007 | Nylander et al. |
| 2007/0183427 A1 * | 8/2007 | Nylander et al. .......... 370/395.2 |
| 2007/0222676 A1 | 9/2007 | Uchida |
| 2007/0258395 A1 | 11/2007 | Jollota et al. |
| 2008/0076392 A1 * | 3/2008 | Gallagher et al. ............ 455/411 |
| 2008/0076398 A1 | 3/2008 | Mate et al. |
| 2008/0096527 A1 | 4/2008 | Lamba et al. |
| 2008/0130596 A1 | 6/2008 | Kalhan |
| 2008/0188265 A1 | 8/2008 | Carter et al. |
| 2008/0244148 A1 | 10/2008 | Nix, Jr. et al. |
| 2008/0287153 A1 | 11/2008 | Fullam |
| 2009/0029645 A1 | 1/2009 | Leroudier |
| 2009/0034482 A1 | 2/2009 | Hahm et al. |
| 2009/0042536 A1 | 2/2009 | Bernard et al. |
| 2009/0052395 A1 | 2/2009 | Bao et al. |
| 2009/0061892 A1 | 3/2009 | Lee et al. |
| 2009/0082010 A1 | 3/2009 | Lee et al. |
| 2009/0092078 A1 | 4/2009 | Czaja et al. |
| 2009/0092096 A1 | 4/2009 | Czaja et al. |
| 2009/0092097 A1 | 4/2009 | Nylander et al. |
| 2009/0092122 A1 | 4/2009 | Czaja et al. |
| 2009/0093246 A1 | 4/2009 | Czaja et al. |
| 2009/0093252 A1 | 4/2009 | Czaja et al. |
| 2009/0098873 A1 | 4/2009 | Gogic |
| 2009/0135758 A1 | 5/2009 | Alper et al. |
| 2009/0290502 A1 | 11/2009 | Tinnakornsrisuphap et al. |
| 2009/0298515 A1 | 12/2009 | Czaja et al. |
| 2010/0184421 A1 | 7/2010 | Lindqvist et al. |

FOREIGN PATENT DOCUMENTS

| | | |
|---|---|---|
| CN | 1894979 A | 1/2007 |
| WO | WO2007016499 | 2/2007 |
| WO | WO2008051124 | 5/2008 |

* cited by examiner

LOCALIZED SILENCE AREA FOR MOBILE DEVICES

PRIORITY INFORMATION

This application claims benefit of priority of U.S. provisional application Ser. No. 61/056,451 titled "FEMTO-CELL WITH LOCALIZED SILENCE CODE" filed May 28, 2008 whose inventors are Stanislaw Czaja and Mark Davis which is hereby incorporated by reference in its entirety as though fully and completely set forth herein.

FIELD OF THE INVENTION

The present invention relates to wireless communication, and more specifically to a system and method for an access point base station to create a localized silence area for mobile devices.

DESCRIPTION OF THE RELATED ART

Wireless communication has become increasingly widespread in recent times. In particular, use of mobile devices such as cellular telephones has become ubiquitous. Typical cellular networks include macro base stations or cellular towers for facilitating communication between mobile devices. More recently, use of "femto-cells" or access point base stations in cellular networks has also been increasing. Femtocells provide a way of extending or improving cellular network coverage into homes, public places, and commercial spaces, typically by making use of data plan services (e.g., DSL, fiberoptic, cable, WiMAX, etc.) which may not require a nearby macro cell of the cellular network.

Such widespread use of mobile devices does present some problems. For example, in public spaces such as theatres (movie or live), concert and convention halls, airplanes, churches, etc, where many people are gathered for an event, the ringing of a telephone can cause a disturbance and interrupt the event.

It is possible to use a jamming transmitter which prevents mobile devices from communicating altogether. The use of such a device could successfully prevent such disturbances at an event where audio disturbance from mobile devices is undesirable. However, as such a jamming transmitter prevents all communication indiscriminately, it also prevents emergency communications using mobile devices, which is generally considered unacceptable at least for safety reasons, and is therefore illegal in most countries.

Proprietors or organizers of such events are thus forced to rely on requesting that event participants to avoid audio uses of mobile devices (e.g., switching from ring mode to vibrate or silent mode, and not placing/receiving audio phone calls in the event area, or turning the mobile device off) during the event. However, people can forget or deliberately ignore such requests, and audio disturbances are likely to still occur. Thus, improvements in the field are desirable.

SUMMARY OF THE INVENTION

Embodiments are presented of a method for an access point base station to create a localized silence area and an access point base station configured to perform the method.

The method may include receiving a mode and a list of mobile device from an access network and registering a mobile device according to the mode and the list. Any direct communication links from the mobile device to any other base stations may be removed via the access network. An indication may be provided to the mobile device that the mobile device is in a localized silence area. The indication may include sending a request to the mobile device to operate in a silent mode. The indication may include sending service priority information to the mobile device, for example, including information about making outgoing calls of different priority levels. The indication may include sending information to the mobile device about receiving voice calls. The indication may include providing a substantially silent indication of an incoming voice call, regardless of the ring setting of the mobile device. Then information may be sent to the mobile device about receiving voice call. The method may be performed for a plurality of mobile devices, e.g., for each mobile device within the service area or the designated localized silence area of the access point base station.

The method may include receiving an incoming voice call to a mobile device from a caller; in this case, a message may be provided to the caller, informing the caller that the user of the mobile device is in a localized silence area. Information may also or alternatively be provided to the caller about procedures for voice calls of each of a plurality of priority levels. In one embodiment, the plurality of priority levels may include emergency voice calls, high-priority non-emergency voice calls, and low-priority non-emergency voice calls. The access point base station may receive input from the caller indicating a priority level of the voice call. The access point base station may perform a procedure corresponding to the priority level of the voice call based on the input. The procedure for an emergency voice call may include immediately paging the mobile device, i.e., allowing the voice call through to the mobile device. The procedure for a high-priority non-emergency voice call may include receiving a first voice message from the caller, performing a voice-to-text translation of the first voice message, and immediately sending a first textual message (e.g., the textual translation of the first voice message) to the mobile device. The procedure for a low-priority non-emergency voice call may include receiving and storing a second voice message from the caller and sending a second textual message to the mobile device at a designated time. The second textual message may indicate the presence of the second voice message to the user of the mobile device.

The method may be performed by an access point base station. The access point base station may include at least one wireless port, which may provide bi-directional communication with one or more mobile devices. The wireless port may enable the access point base station to provide wireless communication in a local area. The access point base station may also include a port for providing bi-directional communication with a service provider (e.g., a cellular service provider) over an IP network. The service provider may also provide wireless communication in a macro area, e.g., via one or more macro base stations. The access point base station may also include a processor (coupled to the port and the wireless port) and a memory medium coupled to the processor. The memory medium may include program instructions executable by the processor to perform the method for creating a localized silence area, as described above according to various embodiments.

One aspect of the invention provides a method for creating a localized silence area for wireless mobile devices which is performed by an access point base station and a mobile device. The method comprises deciding a mode and a list of mobile device, registering a mobile device by an access point base station according to the mode and the list; and removing, by the access point base station, audio communication links from the mobile device to all other macro base stations, wherein said removing prevents the mobile device from performing audio communications with any of the macro base stations independently of the access point base station, sending service priority information to the mobile device, wherein the service priority information comprises a plurality of bits about making outgoing calls of different priority levels.

Creating a localized silence area in this way may substantially reduce or eliminate undesirable audio disturbances within the localized silence area, while still allowing all emergency communications. Embodiments of this method may further provide an advantage of prior art systems by providing silent mechanisms (e.g., voice-to-text translation and corresponding textual messages) for conveying attempted non-emergency audio communications, rather than preventing such attempts altogether.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 1:
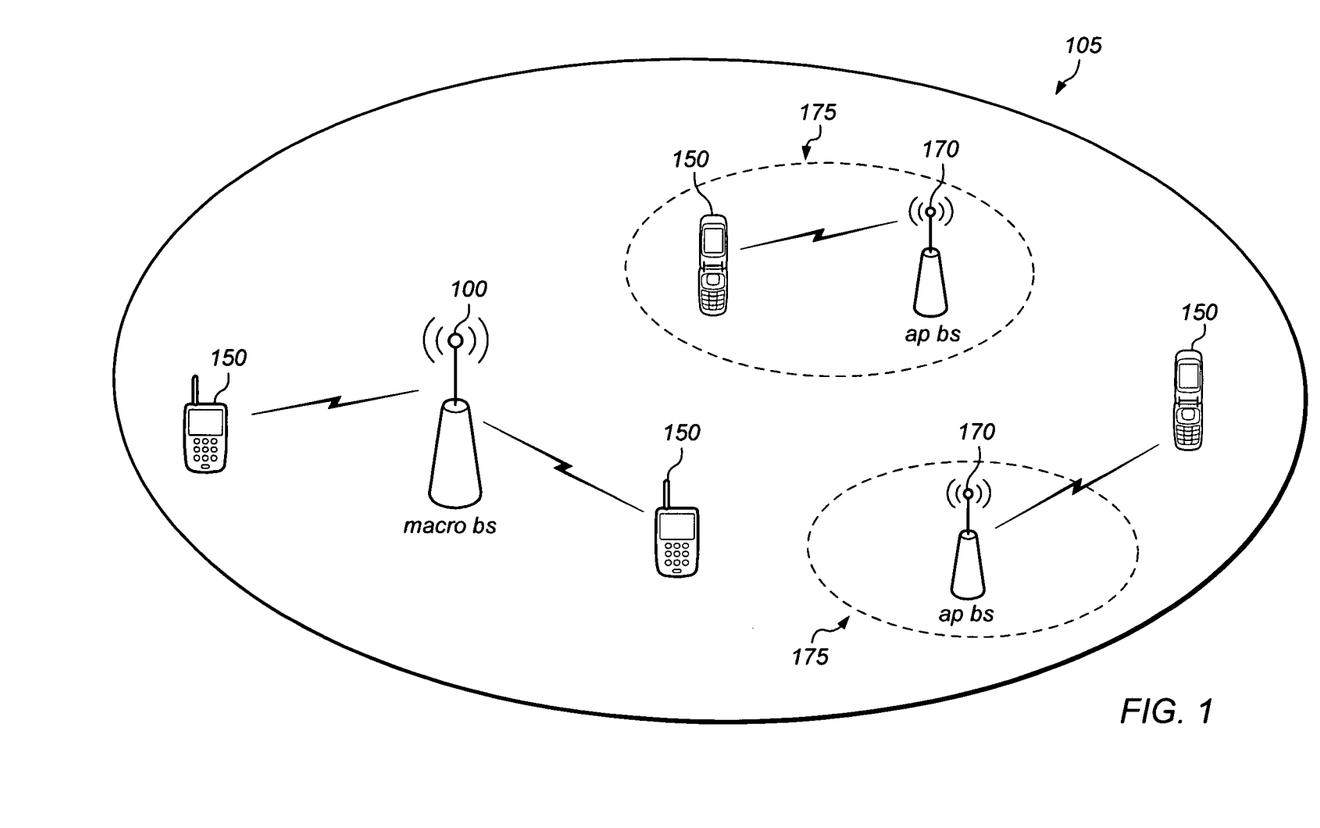
FIG. 1 illustrates an exemplary communication system according to one embodiment.

FIG. 1—Exemplary Communications System

FIG. 1 illustrates an exemplary communication system including a macro base station 100 which provides service in macro area 105, a plurality of access point base stations 170 which provide service in local areas 175, and a plurality of mobile devices 150 (also referred to as "mobile stations" or "access terminals").

The term "access point base station" is intended to include typical definitions (as known by those of skill in the art) of femto-cells, home base stations, personal access points (PAPs), and personal 2G-3G (or nG) base stations, among others. Similarly, the term "macro base station" is intended to include typical definitions (as known by those of skill in the art) of cell phone towers and base stations which provide service in a macro area. The term "base station" is intended to include both access point base stations and macro base stations among other types of base stations, as desired.

The mobile devices (also referred to as "access terminals") 150 may include any type of device which may be used in a cellular network, e.g., for RF communication. The mobile devices may include cellular (or cell) phones (including smart phones), personal digital assistants (PDAs) with mobile communication capabilities, laptops or computer systems with mobile communication components, and/or any device that is operable to communicate with a cellular network. The mobile devices may use various different protocols, e.g., CDMA2000 (1xRTT and EV-DO), UMB, UMTS, LTE, WiMAX, or others). Correspondingly, the base stations 100 and 170 may support any or at least a subset of the protocols used by the mobile devices, e.g., without modification to the standards or protocols for supporting existing mobile devices.

As shown, an access point base station 170 may typically provide wireless communication for mobile devices 150 within a service area 175 which is smaller than the service area 105 of a macro base station 100. The service area 175 within which an access point base station 170 provides wireless communication may be entirely within or overlapping with the service areas 105 of one or more macro base stations 100 and/or the service areas 175 of one or more other access point (or other) base stations 170. A mobile device 150 may thus be registered with more than one base station at any given time, and may, under most circumstances, wirelessly communicate through the base station which provides the best signal to the mobile device at any given time.

Figure 2:
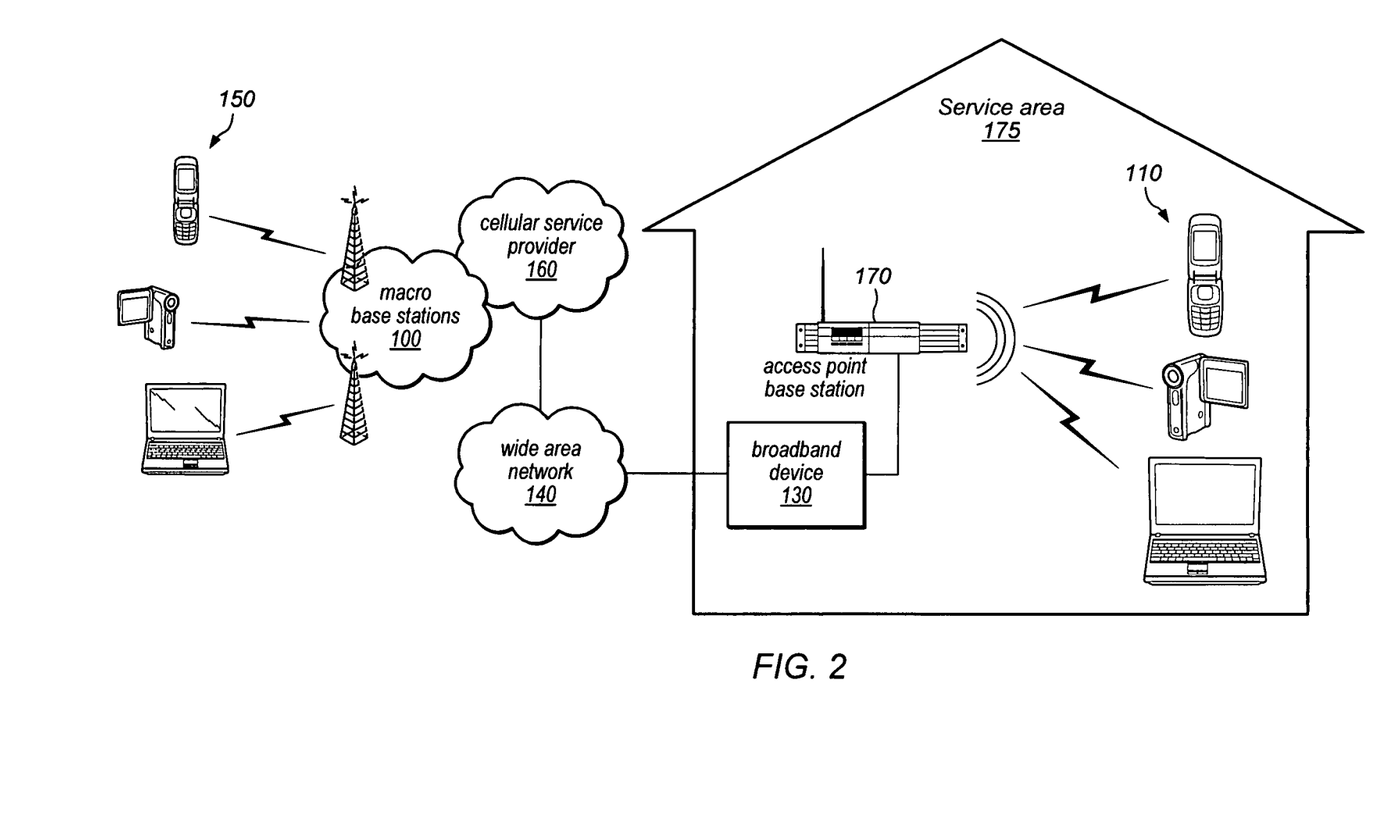
FIG. 2 illustrates an exemplary system including an access point base station according to one embodiment.

FIG. 2—Exemplary Communications System

FIG. 2 illustrates another exemplary communications system according to one embodiment. As shown, FIG. 2 illustrates an access point base station 170 and its service area 175 (e.g., a home, a theater, a concert hall, etc.) which may include one or more mobile devices 110, and in some embodiments a broadband device 130.

The access point base station 170 may operate to receive wireless communication (e.g., radio frequency (RF) communication) from the one or more mobile devices 110 and provide corresponding signals or communication with mobile operator(s) (or cellular service providers) corresponding to the service providers of the mobile devices 110. More specifically, the access point base station 170 may operate to provide communication for the mobile devices 110 using the broadband communications device 130 over an IP wide area network 140 (e.g., the Internet, via the user's internet service provider (ISP)). The broadband device 130 may thus communicate with the cellular service provider 160 via the Internet.

Moreover, the IP wide area network 140 may be private or dedicated to the user using various technologies, for example, lease line, frame relay, digital subscriber line (DSL), or dial-up service. The IP communication may be encrypted or IP tunneling may be used if supported by the IP wide area network 140. The cellular service provider 160 may also be coupled to macro base stations 170 which may operate to provide service to the mobile devices 150, and to the mobile devices 110 when outside of range of the access point base station 170 and/or when the access point base station 170 is disabled or non-operational. Thus, the access point base station 170 may provide bi-directional communication for the mobile devices via an IP network such as the Internet. Stated another way, users in the service area 175 may use their cell phones which communicate with the access point base station, wherein the user's voice communications may be transmitted/received to/from the cellular service provider over an IP network.

The broadband device 130 may include a router and/or cable/DSL modem for connecting to the ISP 140. In one embodiment, the broadband device 130 may include a wireless router (or one or more wireless hubs) which may provide wireless communication (e.g., using 802.11x communication technology) for the access point base station 170. Additionally, the broadband device 130 may be connected to the wide area network 140 via wired (e.g., cable, DSL, fiberoptic, power lines, etc.) or wireless means (e.g., WiMAX or other wireless communication methods), as desired. Alternatively, or additionally, the broadband device 130 may be coupled to the access point base station 170 remotely, e.g., via a WiMAX wireless connection. Furthermore, in one embodiment, the access point base station 170 may include the broadband device 130 (e.g., in an all-in-one solution for the user).

Thus, the access point base station 170 may provide access to the cellular network via the wide area network 140 (e.g., the Internet) using the broadband device 130 (wired or wirelessly).

The access point base station 170 may initially be provisioned (i.e., set up) with various parameters and operating settings. Provisioning may be automatic; for example, the macro base station 100 and/or the service provider 160 may communicate (via the wide area network 140) with the access point base station 170 during installation of the access point base station 170 to perform set up operations automatically. Alternatively, the access point may be provisioned manually, e.g., by a user or technician on site, or by a combination of automatic and manual provisioning, as desired. The provisioning of the access point base station 170 may also in some embodiments be modified or adjusted at a later time, including, in some embodiments, at regular intervals.

Provisioning of the access point base station 170 may include setting various parameters. For example, one or more of the parameters could be used to set the access point base station 170 to create a localized silence area. For example, in a preferred embodiment, there may be an Admission Policy Mode parameter, with settings defined as follows:

APM=OPEN: All mobile devices within the service area 175 will be serviced by the access point base station.
APM=RESTRICTED: Those mobile devices specified in a "preferred users" list have unrestricted access to all resources of the access point base station; all other mobile devices in the service area 175 may be serviced providing resources are available.
APM=PRIVATE: Only those mobile devices specified in the "preferred users" list will be serviced by the access point base station.

There may also be a MODE_EXTENSION for one or more of these settings; for example, in one embodiment, a localized silence area may be specified with APM=RESTRICTED and MODE_EXTENSION=SILENT. In this embodiment, the APM parameter and its mode extension (if any) may be specified in four bits:
APM bit 0—Mode Extension bit 0
APM bit 1—Mode Extension bit 1
APM bit 2—APM bit 0
APM bit 3—APM bit 1
where the bits are defined as:

| Bits [3:2] | 00 = OPEN |
| | 01 = RESTRICTED |
| | 10 = PRIVATE |
| | 11 = RESERVED |
| Bits [1:0] | 00 = SILENT |
| | 01 = RESERVED |
| | 10 = RESERVED |
| | 11 = RESERVED |

Thus, if the access point base station 170 is provisioned with the appropriate parameters, it may be configured (or may configure itself) accordingly to provide a localized silence area. As one of skill in the art will understand, this is only one exemplary embodiment of how an access point base station could be configured to create a localized silence area, and any number of other ways may alternatively be used to configure an access point base station to create a localized silence area, including similarly by means of provisioning parameters; by means of a switch, e.g., in or on the access point base station (e.g., in hardware); or by any appropriate means.

Thus, in one embodiment, the access point base station 170 could be configured to maintain a localized silence area within the service area 175. This may be desirable, for example, if the service area 175 is a movie theater. In this case the localized silence area may substantially prevent audio disturbances via the mobile devices 110 for the duration of the movie. A localized silence area could be similarly desirable in a range of settings and/or locations, such as, for example, churches, concert halls, airplanes and/or airports, convention halls, stage theaters, and private settings. A localized silence area may be suitable for either indoor or outdoor settings in various embodiments. In some embodiments, the access point base station may still allow emergency audio communications via the mobile devices 110 while otherwise maintaining a localized silence area. In some embodiments, localized silence areas may be further supported by "intra-femto traffic routing", which may allow a micro-coverage area within the service area of an access point base station, enabling areas with different service priorities. Thus, in some embodiments, an access point base station may be able to create localized silence area within part, but not all, of its service area 175. Various embodiments of a method for an access point base station to create such a localized silence area are described further with reference to FIGS. 4 and 5.

Figure 3:
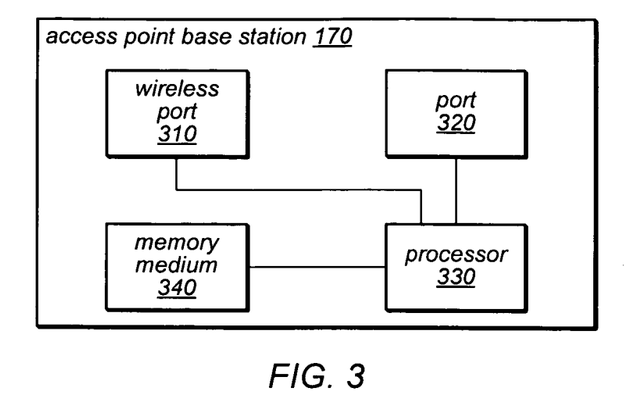
FIG. 3 is a block diagram of an access point base station according to one embodiment.

FIG. 3—Block Diagram of an Access Point Base Station

FIG. 3 is a block diagram of an access point base station 170 according to one embodiment. As shown, an access point base station may include at least a wireless port 310 for providing bi-directional communication with one or more mobile devices (e.g., to provide wireless communication in a local area), as well as a port 320 for providing bi-directional communication over an IP network (e.g., to connect to a cellular service provider). The access point base station may further include a processor 330 and a computer-readable memory medium 340, which may include program instructions executable by the processor to perform various functions, such as those described below for creating a localized silence area.

In various embodiments, the access point base station 170 may include a power supply for providing power to the components of the access point base station 170. The access point base station may also include one or more ports for coupling to other devices or communications devices. For example, in one embodiment, the housing may include a universal serial bus (USB) port (or other type of port, such as firewire, among others) for attaching devices (e.g., printers, personal music players, personal digital assistants, cell phones, external hard drives, testing devices, media controllers, etc.). Additionally, or alternatively, the one or more ports may include Ethernet ports (e.g., for coupling to a router or a communications device, among others), fiber ports, cable ports, etc.

Figure 4:
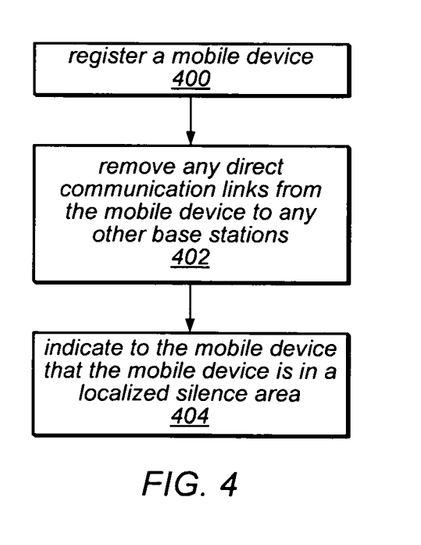
FIG. 4 is a flowchart diagram illustrating a method for an access point base station to create a localized silence area according to one embodiment.

FIG. 4—Method for Creating a Localized Silence Area

FIG. 4 is a flowchart diagram illustrating a method for creating a localized silence area, according to one embodiment. In some embodiments, the method may be implemented by an access point base station, such as an access point base station 170 described according to various embodiments with regard to FIGS. 1-3. The access point base station may have been specifically provisioned to create a localized silence area, for example as described with respect to FIG. 2, or in any of various ways.

In 400, a mobile device is registered with an access point base station. The mobile device may be within the service area of the access point base station; for example, the mobile device may have just entered the service area, or may have previously been powered off and may be powered on while within the service area. In either case, the mobile device may register with the access point base station, as it is within range for the access point base station to provide wireless communication for the mobile device. In some embodiments, the mobile device may be within range of more than one base station, e.g., a macro base station, or another access point base station. In this case, the mobile device may be registered with multiple base stations. The access point base station may be the primary provider of wireless communication to the mobile device while the mobile device is in the service area of the access point base station. Alternatively, the access point base station may not be the primary provider of wireless communication to the mobile device, e.g., if the access point base station cannot provide sufficient quality of service (QoS) and/or another base station can provide a stronger signal.

In the preferred embodiment, the access point base station may be operating in RESTRICTED/SILENT mode, as noted above. In this case, any mobile devices not listed in the preferred users list may be required to register with the access point base station each time they enter the service area. Once the QoS for a given mobile device from the access point base station is sufficient, the access point base station may receive hand-off (HO) from the base station which was previously servicing the mobile device. The base station may then be removed from the mobile device's "Active Set" (e.g., the mobile device's registry of base stations within range to provide service). A radio access network (RAN) for the cellular service provider may also store the location of the mobile device in order to direct all pages (e.g., voice calls and other communications) and messages intended for the mobile device. In some embodiments, this may limit the bandwidth requirements and interference in the macro base station control channels (such as, e.g., a paging channel).

In some embodiments, it may be beneficial (e.g., in order to guarantee that all mobile devices receive any communications regardless of their location) to require registration of a mobile device each time the mobile device moves into or out of the access point base station's service coverage area. Although this may achieved in any number of possible ways, in one embodiment the following steps may be taken to achieve this:

a) require that the mobile device register with the access point base station or the RAN after a transition from the access point base station to another base station or vice versa after a certain amount of time (e.g., 1 s) even if the mobile device is in an idle state, if the mobile device was serviced by the first base station during the time required for re-registration.

b) activate a timer at the RAN after HO to the access point base station is completed; when the timer runs out, reset the timer, unless HO back from the access point base station to the RAN has been performed.

c) activate the timer and the RAN after a mobile device previously registered with the access point base station re-registers with another base station.

d) if a mobile device in idle mode leaves the coverage of the access point base station and registers with another base station, send a message from the RAN to the access point base station indicating that the mobile device has left its coverage area.

e) activate a timer at the access point base station after a mobile device registers at the access point base station, where the timer is set to expire at a certain time (e.g., at the end of a movie, play, concert, etc.) or when the access point base station receives a message as described in d).

In 402, any direct communication links from the mobile device to any other base stations may be removed. In other words, all communication to or from the mobile device will go through the access point base station. This may be accomplished by removing any other base stations from the "Active Set" of the mobile device. In this way, a mobile device may be prevented from "accidentally" receiving or placing a voice call while in the localized silence area by way of a different base station.

In 404, the access point base station may indicate to the mobile device that the mobile device is in a localized silence area. This may include sending a textual message (such as an SMS message) to the mobile device with information indicating that the mobile device is in a localized silence area. For example, the message may include a request that the mobile device change to profile configuration related to ring setting, such as switching to a silent (or vibrate) mode, e.g., instead of a ring mode. The message may include information about incoming and/or outgoing calls. For example, in one embodiment, there may be no restriction on outgoing emergency call (e.g., 911). Non-emergency calls may require dialing a prefix (e.g., 999, or any number), and/or there may be a designated area for making outgoing calls, in which case the message may indicate the location of the designated area. Similarly, there may be an area designated for receiving incoming calls, e.g., a lobby or foyer. The message may also or alternatively provide information on procedures for incoming calls, which will be described below according to various embodiments. While a textual (e.g., SMS) message is one possible way of indicating to the mobile device that it is in a localized silence area, other ways are also possible. For example, in one embodiment, the access point base station may automatically bypass the ringer of a mobile device and instead stimulate its vibrator if the mobile device receives an incoming call, by way of indication. Any of various other ways of indicating to the mobile device that the mobile device is in a localized silence area are also possible, as will be apparent to one of skill in the art.

Figure 5:
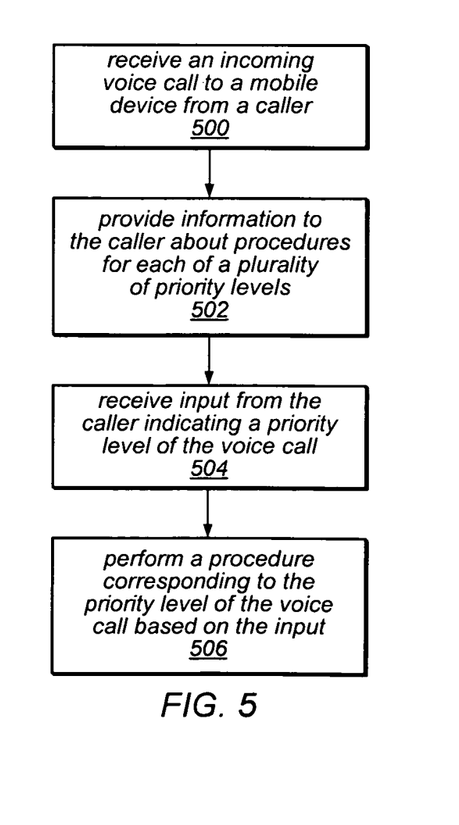
FIG. 5 is a flowchart diagram illustrating a method for receiving an incoming voice call in a localized silence area according to one embodiment.

FIG. 5—Method for Receiving an Incoming Voice Call in a Localized Silence Area

FIG. 5 is a flowchart diagram illustrating a method for receiving an incoming voice call in a localized silence area. The method may be performed by an access point base station. The method may, in some embodiments, be considered a natural extension of the method described with respect to FIG. 4, e.g., procedures for receiving an incoming voice call to a mobile device within the localized silence area may be an integral part of maintaining the localized silence area. It should be noted, however, that while this section primarily includes a detailed description of a few variations of a particular embodiment, any number of variations of the method, or other methods altogether, of receiving an incoming voice call in a localized silence area, are also possible.

In 500, an access point base station may receive an incoming voice call from a caller to a mobile device within the localized silence area. The access point base station may not immediately page the mobile device. The access point base station may instead indicate to the caller that the mobile device is in a localized silence area, e.g., in step 502.

In 502, the access point base station may provide information to the caller about procedures for each of a plurality of priority levels. It should be noted that any number of priority levels with various accompanying procedures are possible; thus, the example below is primarily exemplary, and is not intended to be limiting. In one embodiment, the access point base station may send the caller a pre-recorded message indicating that the target user (i.e., the user of the mobile device for which the incoming voice call is intended) is in a localized silence area, and/or what the procedures are for various priority level calls. In one exemplary embodiment, there may be three priority levels for voice calls, e.g., emergency voice calls, high-priority non-emergency voice calls, and low-priority non-emergency voice calls. The caller may further be informed how to indicate the priority level of their call; for example, the caller may be informed to press 9 for an emergency, to press 99 for high-priority non-emergency voice calls, and to leave a message after a beep for low-priority non-emergency voice calls. In some embodiments the caller may be informed of the expected duration of the localized silence area, e.g., a time at which there will be an intermission, or a time at which a performance or event ends. The caller may further be informed what the procedures are for each priority level; alternatively, the caller may simply be informed of the priority level choices and be asked for input on the priority level of their call.

In 504, input from the caller may be received, indicating the priority level of the voice call. The input may be an input into a number-pad, e.g., of a touch-tone telephone or a mobile telephone. Alternatively, the input may be an audio input, for example, the caller may be asked to say "emergency", "high priority", or "low priority". In one embodiment, the caller may simply wait (e.g., not provide an input) and the access point base station may accept this as an indication, e.g., of a low priority voice call. In short, the input indicating the priority level of the incoming voice may be received in any of various ways, as desired.

In 506, the access point base station may perform a procedure corresponding to the priority level of the voice call based on the input. Thus, in the exemplary embodiment described above, i.e., with emergency, high priority, and low priority voice calls, the access point base station may perform the procedure corresponding to the priority level indicated by the caller. An exemplary procedure for an emergency call may simply be to allow the call (e.g., page the mobile device) regardless of the ring setting (silent, vibrate, ring, etc.). This may cause a disturbance in the localized silence area; however, for safety purposes, it may be desirable to allow for the possibility of such a disturbance in case of an emergency. An exemplary procedure for a high-priority non-emergency voice call could include providing a voice-to-text translation of a message from the caller to the mobile device, and delivering the message (in textual form, e.g., in an SMS message) to the mobile device. An exemplary procedure for a low-priority non-emergency voice call could include recording a voice message from the caller, and sending a textual message to the mobile device, either immediately or at a later time (such as an intermission, or the end of a performance or show), informing the user of the mobile device of the message. It should be noted that other procedures for these priority levels, or other procedures for other possible priority levels, are also possible, as will be apparent to one of skill in the art.

In various embodiments, it is also be possible that a mobile device may be the intended recipient of a non-voice message (e.g., a textual message, such as SMS) while in a localized silence area. In this case, the message may be buffered by the access point base station and sent to the mobile device when the localized silence area is removed (e.g., an intermission or the end of a performance or show) or when the mobile device leaves the localized silence area; alternatively, non-voice (e.g., silent) messages may be allowed by the localized silence area, and therefore may be provided to the intended mobile device immediately.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for an access point base station to create a localized silence area, wherein the access point base station is coupled to an access network, wherein the access network provides wireless communication in a macro area via a macro base station, the method comprising:
   receiving a mode and a list of mobile devices from the access network;
   registering a mobile device according to the mode and the list, wherein said registering provides a communication link between the mobile device and the access network via the access point base station;
   removing any direct communication links from the mobile device to any other base stations via the access network, wherein the communication link between the mobile device and the access network via the access point base station remains active after any direct communication links from the mobile device to any other base stations are removed;
   indicating to the mobile device that the mobile device is in the localized silence area, wherein the localized silence area comprises one or more of a plurality of micro-coverage areas within the service area of the access point base station, and wherein the plurality of micro-coverage areas have different service priorities;
   sending information to the mobile device about receiving a voice call;

receiving an incoming voice call to the mobile device from a caller, and providing Information to the caller about procedures for each of a plurality of priority levels of the incoming call; wherein the plurality of priority level includes an emergency voice call priority level and at least an non-emergency call priority level;

wherein the mobile device receives a non-voice message from the access point base station when the localized silence area is removed by the access point base station based on removal condition parameters indicated in the received mode.

2. The method of claim 1, wherein the mode comprises an open mode and a restricted mode to manage outgoing calls, the list of mobile devices indicating the associated preferred mobile devices within the localized silence area.

3. The method of claim 2, wherein:

when the mode indicates the open mode, the mobile device within the localized silence area is allowed for the outgoing call; and when the mode indicates the restricted mode, the mobile device not found in the list is restricted for the outgoing call.

4. The method of claim 1, wherein the registering a mobile device is completed after a transition from the access point base station or after a certain amount of time which is set by a timer, and the timer is configured to be active in response to registering with another base station.

5. The method of claim 1, wherein indicating to the mobile device that the mobile device is in a localized silence area comprises:

providing to the mobile device a substantially silent indication of an incoming voice call regardless of the ring setting of the mobile device.

6. The method of claim 1, wherein said registering step is performed in response to any of the following conditions:

if the mode denotes a first mode; and if the mode denotes a second mode and the mobile device is found in the list.

7. The method of claim 1, further comprising, receiving an incoming voice call to the mobile device from a caller; and providing a notification to the caller informing the caller that the mobile device is in a localized silence area.

8. The method of claim 1, further comprising:

receiving input from the caller indicating a priority level of the voice call; and performing a procedure corresponding to the priority level of the voice call based on the input.

9. The method of claim 8, wherein the plurality of priority levels comprise;

emergency voice call for immediately paging the mobile device;

high-priority non-emergency voice call for receiving a first voice message, performing a voice-to-text translation of the first voice message and immediately sending a first textual message comprising a textual translation of the first voice message to the mobile device; and low-priority non-emergency voice call for receiving, storing a second voice message and sending a second textual message to the mobile device at a designated time, wherein the second textual message indicates the presence of the second voice message.

10. An access point base station, comprising:

at least one wireless port for providing bi-directional communication with one or more mobile devices, wherein the at least one wireless port is usable in providing wireless communication in a local area;

a first port for providing bi-directional communication with an access network, wherein the access network provides wireless communication in a macro area via a macro base station;

a processor coupled to the at least one wireless port and the first port; and a memory medium coupled to the processor, wherein the memory medium comprises program instructions executable by the processor to:

receive a mode and a list of mobile devices from the access network via the first port;

register a mobile device according to the mode and the list via the at least one wireless port, wherein said registering provides a communication link between the mobile device and the access network via the access point base station;

remove any direct communication links from the mobile device to any other base stations via the access network, wherein the communication link between the mobile device and the access network via the access point base station remains active after any direct communication links from the mobile device to any other base stations are removed;

indicate to the mobile device, via the at least one wireless port, that the mobile device is in a localized silence area, wherein the localized silence area comprises one or more of a plurality of micro-coverage areas within the service area of the access point base station, and wherein the plurality of micro-coverage areas have different service priorities;

receive an incoming voice call to the mobile device from a caller;

provide information to the caller about procedures for each of a plurality of priority levels of the incoming call;

receive input from the caller indicating a priority level of the voice call; and perform a procedure corresponding to the priority level of the voice call based on the input;

wherein the plurality of priority levels comprise:

an emergency voice call for immediate paging the mobile device;

a high priority non-emergency voice call for receiving a first voice message, performing a voice-to-text translation of the first voice message, and immediately sending a first textual message comprising a textual information of the first voice message to the mobile device; and a low priority non-emergency voice call for receiving, storing a voice call message, and sending a second textual message to the mobile device at a later time, wherein the second textual message indicates the presence of the second voice message; wherein the mobile device receives a non-voice message from the access point base station when the localized silence area is removed by the access point base station based on removal condition parameters indicated in the received mode.

11. The access point base station of claim 10, wherein the mode comprises an open mode and a restricted mode to manage outgoing calls, the list of mobile devices indicating the associated preferred mobile devices within the localized silence area.

12. The access point base station of claim 11, wherein:

when the mode indicates the open mode, the mobile device within the localized silence area is allowed for the outgoing call; and when the mode indicates restricted mode, the mobile device not found in the list is restricted for the outgoing call.

13. The access point base station of claim 10, wherein the program instructions executable to register a mobile device after a transition from the access point base station or after a certain amount of time which is set by a timer, and the timer is configured to be active in response to registering with another base station.

14. The access point base station of claim 10, wherein the program instructions executable to indicate to the mobile device that the mobile device is in a localized silence area is executable to:
provide to the mobile device a substantially silent indication of an incoming telephone call regardless of the ring setting of the mobile device.

15. The access point base station of claim 10, wherein the program instructions executable to register a mobile device according to the mode and the list via the at least one wireless port in response to any of the following conditions:
if the mode denotes a first mode; and
if the mode denotes a second mode and the mobile device is found in the list.

16. The access point base station of claim 10, wherein the program instructions are further executable to:
receive an incoming voice call to the mobile device from a caller; and
provide a notification to the caller informing the caller that the mobile device is in a localized silence area.

17. A method for creating a localized silence area for wireless mobile devices, the method comprising:
providing a plurality of micro-coverage areas within the service area of an access point base station, wherein the plurality of micro-coverage areas have different service priorities, and wherein the localized silence area comprises one or more of the plurality of micro-coverage areas;
receiving a mode and a list of mobile devices by the access point base station;
registering a mobile device according to the mode and the list by the access point base station, wherein said registering provides a communication link between the mobile device and the access network via the access point base station;
removing, by the access point base station, audio communication links from the mobile device to all other macro base stations, wherein said removing prevents the mobile device from performing voice communications with any of the macro base stations independently of the access point base station, wherein the communication link between the mobile device and the access network via the access point base station remains active after audio communication links from the mobile device to all other macro base stations are removed;
receiving an incoming voice call to the mobile device from a caller;
providing information to the caller about procedures for each of a plurality of priority levels of the incoming call;
receiving input from the caller indicating a priority level of the voice call; and
performing a procedure corresponding to the priority level of the voice call based on the input;
wherein the plurality of priority levels comprise
an emergency voice call,
a high-priority non-emergency voice call, and
a low-priority non-emergency voice call, and wherein the procedure for the low-priority non-emergency call comprises receiving and storing a voice message, and sending a textual message to the mobile device at a later time, wherein the second textual message indicates the presence of the second voice message; wherein the mobile device receives a non-voice message from the access point base station when the localized silence area is removed by the access point base station based on removal condition parameters indicated in the received mode.

* * * * *

UNITED STATES PATENT AND TRADEMARK OFFICE
CERTIFICATE OF CORRECTION

PATENT NO. : 8,744,493 B2  
APPLICATION NO. : 12/471651  
DATED : June 3, 2014  
INVENTOR(S) : Stanislaw Czaja and Mark E. Davis Page 1 of 1

It is certified that error appears in the above-identified patent and that said Letters Patent is hereby corrected as shown below:

On the title page item 73, Assignee should read:
VIA Telecom, Inc. San Diego, CA
IPComm, Cardiff, CA Signed and Sealed this
Twentieth Day of October, 2015

Michelle K. Lee
*Director of the United States Patent and Trademark Office*